United States Patent [19]

van Calker et al.

[11] Patent Number: 4,877,126
[45] Date of Patent: Oct. 31, 1989

[54] CONVEYOR BELT

[75] Inventors: Freerk R. van Calker, Lathum; Pieter J. M. Kopmels, Wehl; Antonius W. M. Ter Burg, Arnhem, all of Netherlands

[73] Assignee: Akzo nv, Arnhem, Netherlands

[21] Appl. No.: 203,739

[22] Filed: Jun. 2, 1988

[30] Foreign Application Priority Data

Jun. 4, 1987 [NL] Netherlands ............ 8701305

[51] Int. Cl.⁴ .............................. B65G 15/34
[52] U.S. Cl. ................... 198/847; 428/257; 474/267
[58] Field of Search ............ 198/844, 847; 428/257, 428/259, 246, 290, 258; 474/266, 267, 271

[56] References Cited

U.S. PATENT DOCUMENTS

| | | | |
|---|---|---|---|
| 3,944,060 | 3/1976 | Hartmann | 198/847 |
| 4,569,883 | 2/1986 | Renjilian | 428/257 X |
| 4,647,495 | 3/1987 | Kanayama et al. | 428/257 X |

FOREIGN PATENT DOCUMENTS

| | | | |
|---|---|---|---|
| 0048332 | 8/1981 | Fed. Rep. of Germany . | |
| 0007081 | 2/1987 | Japan | 198/847 |
| 1014922 | 12/1965 | United Kingdom | 474/267 |
| 1273528 | 5/1972 | United Kingdom . | |
| 2003577 | 3/1979 | United Kingdom . | |
| 2095295 | 9/1982 | United Kingdom | 474/267 |
| 2101643 | 1/1983 | United Kingdom . | |

*Primary Examiner*—Robert J. Spar
*Assistant Examiner*—James R. Bidwell
*Attorney, Agent, or Firm*—Stevens, Davis, Miller & Mosher

[57] ABSTRACT

Filte restproof conveyor belt, which has a high strength, and is particularly suitable for use in coal mines. It includes a matrix of, e.g. rubber having incorporated therein at least one layer of reinforcement fabric extending parallel to the supporting surface and the tread of the belt, the warp of the fabric extending in the longitudinal direction of the belt and including both polyamide and polyester filaments. Filtertestproof qualities are imparted to the belt by using aramid filaments as polyamide warp filaments, and by weaving the fabric in such a way that the yarn-in-fabric take-up of the aramid warp yarns, cords or cables is higher than that of the polyester warp yarns, cords or cables.

9 Claims, 1 Drawing Sheet

CONVEYOR BELT

The invention relates to a conveyor belt formed by a matrix, more particularly based on rubber, such as polychloroprene rubber, in which there is at least provided a layer of reinforcing fabric extending parallel to the bearing surface and the tread of the conveyor belt, of which reinforcing fabric the load bearing warp extending in longitudinal direction of the conveyor belt contains filaments of polyester and filaments of polyamide.

A conveyor belt of the type indicated above is described in EP 0 048 332 B1. In said known conveyor belt at least some warp threads are polyamide-coated. Alternatively of at least some warp threads at least one single polyester threads are twisted together with at least one polyamide thread. This known conveyor belt was developed mainly for use in underground mining, where the conveyor belt must pass the so-called filter test. In this test a pre-determined amount of belt material is heated up to a prescribed temperature in a closed vessel. The gases evolved during decomposition are mixed with air and water vapour and subsequently passed through a test filter. The increase in flow resistance in the filter during the test must not exceed a prescribed value. For one thing, it is known that with this type of conveyor belts it is especially the polyester part of the reinforcing fabric which is determinative of the filter test being passed or not, i.e. the higher the polyester share in the reinforcing fabric, the greater will be the chance of the filter being clogged by the evolving terephthalic acid. For another thing, this type of conveyor belts in the higher strength range call for the use of a reinforcing fabric displaying a high tensile strength and a low elongation at rupture. The polyester filaments are to a high degree determinative of the high strength and the low elongation. From the afore-going, however, it appears that increasing the number of polyester warp threads to obtain a high strength and low elongation may lead to problems due to the smouldering behaviour of polyester, because the filter test requirements can no longer be satisfied. Adding polyamide warp threads to the reinforcing fabric, as proposed in EP 0 048 332 B1, does result in a higher tensile strength of the belt without any negative effect on the filter test, but the elongation at rupture and the creep behaviour of the belt are detrimentally affected.

Another solution to the afore-mentioned problems is proposed in DE 3 445 496 A1. It describes a conveyor belt reinforced with a fabric comprising at least three layers of polyamide weft yarns, with the two outer layers of polyamide weft yarns practically entirely covering the polyester warp yarns that are centrally positioned in the fabric. In other words, the use of an extra large number of polyamide weft yarns arranged in a special way will result in the polyester warp yarns being practically entirely wrapped up by said polyamide yarns in order to satisfy the requirements of the above filter test. In carrying out the filter test on the conveyor belt according to DE 3 445 496 A1 first of all the outer polyamide weft yarns of the conveyor belt sample will start to smoulder and only then the polyester warp threads. This known conveyor belt has the disadvantage, however, that it must comprise an additional amount of polyamide weft yarn and the use of the three weft layers, for instance, causes the reinforcing fabric to be more intricate and costly. Moreover, the relatively thick reinforcing fabric will render this known conveyor belt less flexible, which may detrimentally influence the resistance to the varying bending load encountered under operating conditions.

It should be added that a conveyor belt comprising a reinforcing fabric containing polyester warp yarns and polyamide weft yarns is generally described in DE 22 34 915 A1. Besides, GB No. 2 003 577 A describes a conveyor belt provided with a reinforcing layer consisting of cords of poly(p-phenylene terephthalamide).

GB 2 101 643 A describes a reinforcing fabric for a conveyor belt in which two arrays of linear, load bearing yarns are interconnected via three arrays of weft cords by two groups of lower and upper binder warp yarns (see FIG. 2), which extend among the linear warp cords in a zig-zag manner usual for binder yarns. The load bearing warp cords and the binder warp yarns are made of the same material.

GB 2 082 639 A does not describe a conveyor belt, but a sling belt provided at its ends with loops and containing two or three separate fabrics, the lower most fabric consisting of aramid yarns.

GB 2 048 773 A, page 4, lines 44–107 (see FIG. 6) describes a conveyor belt which contains as central reinforcing layer a number of parallel cables of aramid extending in longitudinal direction of the conveyor belt, the space between the successive reinforcing cables having a width of up to about twice the diameter of the reinforcing cables. In that space are cords which may be of polyester. Since polyester cords have a greater elongation than the aramid cables, it is proposed that they be processed with a particular initial stress during the production of the conveyor belt. Such an additional step calls for additional care during manufacture and can be applied only in the kind of manufacturing process for conveyor belts in which the stress in the reinforcing cables and cords can be individually set prior to calandering and in which consequently no use is made of reinforcing fabric. In a conveyor belt containing a reinforcing fabric in which the warp consists of load bearing aramid cords and polyester cords or yarns no such stress provision can be made at all.

EP 0 185 177 A1 describes a sieve fabric for a paper machine. The FIGS. 8 and 9 in it show an embodiment containing yarns displaying a differing yarn-in-fabric take up. No mention is made of the materials of which these yarns are made.

The invention has for its object to provide a conveyor belt of the type indicated in the opening paragraph which no longer displays the drawbacks to the well-known conveyor belts. The conveyor belt according to the invention is characterized in that the polyamide in the warp is of aramid and the aramid load bearing warp yarns, cords or cables in the reinforcing fabric have a yarn-in-fabric take up which is for instance, 2 to 15%, more particularly 4 to 9%, higher than the yarn-in-fabric take up of the load bearing polyester warp, which latter take up is preferably in the range of about 2 to 10%. According to the invention the yarn-in-fabric take up of the aramid warp is 4 to 25%, more particularly 6 to 19%. A preferred embodiment of the conveyor belt according to the invention is characterized in that in the reinforcing fabric the aramid warp material is of poly(p-phenylene terephthalamide) (PPDT), the polyester warp is of polyethylene terephthalate (PETP), and the weft is of polyamide 66 or polyamide 6. A particularly favourable embodiment of the conveyor belt according to the invention is characterized in that at least 5 percent by weight and not more than 80 percent by weight, more particularly 10 to 50 percent by weight, of the warp material in the reinforcing fabric is of aramid.

The conveyor belt according to the invention is particularly suitable for use in underground mining in the strength grade usual for this purpose. For, the conveyor belt according to the invention first of all has a higher tensile strength and a lower elongation at rupture than the above-described known conveyor belts when using the same mass of reinforcing fabric per unit of surface area. Moreover, the smouldering behaviour of the conveyor belt according to the invention is so favourable that the requirements of said filter test can amply be met. This feature is particularly surprising and was not expected by the man skilled in the art in that, because of the terephthalic groups present in the aramids, the smouldering behaviour similar to that of polyester would have been expected in the filter test.

By said aramid is to be understood here a synthetic polyamide in which at least 85% of the amide bonds are directly linked to two aromatic rings. As examples of such aramids may be mentioned poly(para-phenylene terephthalamide) and copolyamide built up from p-phenylene diamine, 3,4'-diaminodiphenyl ether and terephthalic acid groups.

The term yarn-in-fabric take up of x% used in the present description and claims refers to the degree of yarn-in-fabric take up as measured in accordance with ASTM-D1910-64. The yarn-in-fabric take up referred to in the description and in the claims invariably refers to the yarn-in-fabric take up in accordance with said ASTM specification measured on the reinforcing material as it is in the conveyor belt and on warp yarns removed from the conveyor belt.

The term creep used in the present description refers to the deformation of material, more particularly the extension of the material, under the influence of dynamic loading. The magnitude of the creep is expressed in the percentage extension in time, i.e. in 1 year or in 10 years.

The tensile strength and the elongation at rupture of the reinforcing belt according to the invention were determined in accordance with DIN 22109, Vol. 2.

The invention will be further described with reference to the accompanying schematic drawing.

Figure 2:
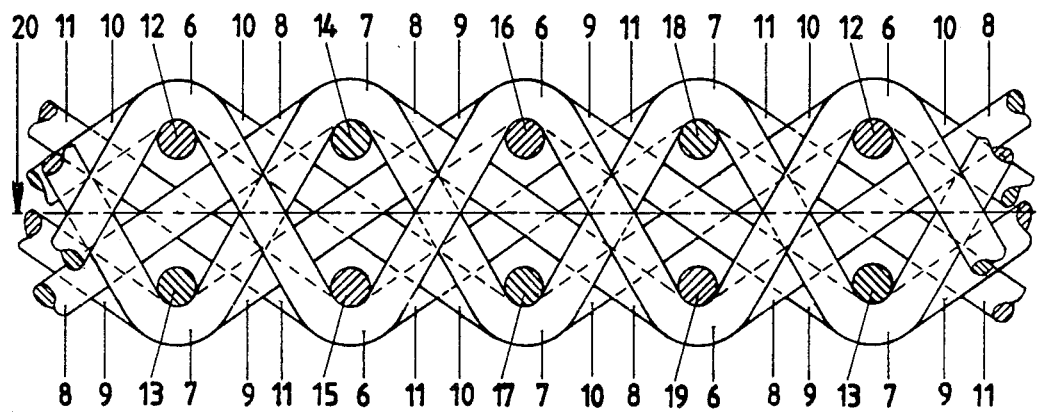
FIG. 2 is a detailed sectional view of the reinforcing fabric in longitudinal direction of the conveyor belt.
Figure 1:
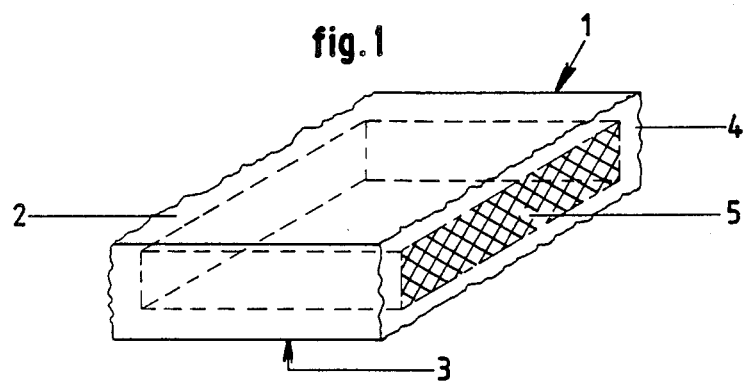
FIG. 1 is a sectional view in perspective of the conveyor belt.
Figure 3:
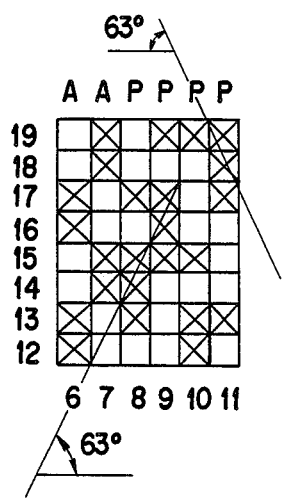
FIG. 3 shows a weave for the reinforcing fabric, viz. the combination of a polyester warp in 3 1/1 3 63° cross-twill two-ply weave and an aramid warp in 2/2-warp rib weave.

FIG. 1 shows a conveyor belt 1 with a bearing surface 2 and a tread 3. In the matrix 4 of polychloroprene rubber is contained the reinforcing fabric 5. As appears from the longitudinal section in FIG. 2 of the reinforcing fabric 5, this fabric consists of two groups of warp threads 6 and 7 of PPDT and warp threads 8, 9, 10, 11 of polyethylene terephthalate. FIG. 3 shows the weave used in the illustrated embodiment of the reinforcing fabric 5. In FIG. 3 the warp threads 6-11 are referred to by the same numerals as in FIG. 2, the polyester warp threads being indicated by P and the aramid warp threads by A. The weft threads in FIG. 3 are indicated by 12-19 and the X mark indicates that the warp lies on the weft. In the embodiment shown in FIG. 2 the yarn-in-fabric take up for the aramid warp yarns 6, 7 in the conveyor belt is 12-13%, whereas for the polyester warp yarns it is 4-5%, which means that in this embodiment the yarn-in-fabric take up applied for the aramid warp 6, 7 is about 7-8% higher than for the polyester warp 8, 9, 10, 11. The difference in yarn-in-fabric take up between the two groups of warp yarns also appears clearly from FIG. 2, which shows that the "wave length" of the aramid yarns 6, 7 relative to the central plane 20 of the reinforcing fabric 5 is considerably smaller than that of the polyester warp yarns 8, 9, 10, 11, with the "amplitude" being the same. In the illustrated embodiment the PETP warp consists of cord of the construction dtex 1100 f 210 Z 60×4 S 60 (t/m). The PPDT warp consists of twisted yarn of the construcion dtex 1680 f 1000 Z 60 t/m, whereas the weft consists of polyamide 66 yarn of the construction dtex 1880 f 280×2 S60 t/m. The number of warp threads is 262 per 10 cm and the number of west threads 74 per 10 cm. In this example the mass of the reinforcing fabric 5 is about 1350 g/m². Within the scope of the invention various modifications may be made. Although in the first place the invention comprises a conveyor belt having a rubber matrix, the present invention also makes it possible to provide the rubber matrix with a relatively thin coating of some other material. Further, the rubber matrix may contain several more or less usual additives, such as plasticizers. Apart from the weave shown as example in the drawing, various other weaves may be used for the reinforcing fabric, such as a polyester warp in 3 1/1 3 63° twill two-ply weave, a polyester warp in 3 1/1 3 63° cross-twill two-ply weave.

The weaves for polyester may each be combined with the following weaves for aramid:
aramid warp in 2/2-warp rib weave;
aramid warp in 2/2-45° cross-twill weave;
aramid warp in 2/2-double balanced twill.
Other weave alternatives are:
polyester warp in 2/2 hopsack weave or
twill weave combined with aramid warp in plain.

We claim:

1. A conveyor belt formed by a matrix, more particularly based on rubber, such as polychloroprene rubber, in which there is at least provided a layer of woven reinforcing fabric extending parallel to the bearing surface and the tread of the conveyor belt, of which reinforcing fabric the warp extending in longitudinal direction of the conveyor belt comprises both load bearing yarns, cords or cables consisting of polyester and load bearing yarns, cords or cables consisting of aramid, wherein the load bearing aramid warp yarns, cords or cables in the reinforcing fabric display a greater yarn-in-fabric take up than the load bearing polyester yarns, cords or cables.

2. A conveyor belt according to claim 1, characterized in that the yarn-in-fabric take up of the load bearing aramid warp is 2 to 15%, more particularly 4 to 9%, greater than the yarn-in-fabric take up of the load bearing polyester warp.

3. A conveyor belt according to claim 1, characterized in that the yarn-in-fabric take up of the load bearing polyester warp is 2 to 10%.

4. A conveyor belt according to claims 1 and 3, characterized in that the yarn-in-fabric take up of the load bearing aramid warp is 4 to 25%, more particularly 6 to 19%.

5. A conveyor belt according to claim 1, characterized in that the load bearing aramid warp material comprises poly(p-phenylene terephthalamide).

6. A conveyor belt according to claim 1, characterized in that the load bearing polyester warp is of polyethylene terephthalate.

7. A conveyor belt according to claim 1, characterized in that the weft is of polyamide 66 or polyamide 6.

8. A conveyor belt according to claim 1, characterized in that at least 5 percent by weight, more particularly 10 to 50% by weight, of the load bearing warp material in the reinforcing fabric is of aramid.

9. A conveyor belt according to claim 8, characterized in that not more than 80% by weight of the load bearing warp material in the reinforcing fabric is of aramid.

* * * * *